United States Patent

[11] 3,570,395

[72] Inventors Harry C. Eberly
Narvon;
Raymond E. Fisher, New Holland, Pa.
[21] Appl. No. 664,685
[22] Filed Aug. 31, 1967
[45] Patented Mar. 16, 1971
[73] Assignee Sperry Rand Corporation
New Holland, Pa.

[54] BALER FEEDING SYSTEM
13 Claims, 6 Drawing Figs.

[52] U.S. Cl. .................................................. 100/189,
56/341, 198/209
[51] Int. Cl. .................................................. B30b 1/00
[50] Field of Search ............................................ 100/189,
188, 142; 56/341, 342; 198/209, 212, 222

[56] References Cited
UNITED STATES PATENTS

| | | | |
|---|---|---|---|
| 2,920,752 | 1/1950 | Heinlein et al. | 100/189X |
| 2,950,807 | 8/1960 | McDuffie | 100/142X |
| 2,975,581 | 3/1961 | Matthies | 56/341 |
| 2,545,188 | 3/1951 | Baskerville | 100/142 |
| 2,720,073 | 10/1955 | Freeman, Jr. et al. | 100/189X |
| 3,103,775 | 9/1963 | Evans et al. | 56/341 |

FOREIGN PATENTS

| 252,735 | 3/1967 | Austria | | |
|---|---|---|---|---|

*Primary Examiner*—Peter Feldman
*Attorneys*—Joseph A. Brown and Donald D. Schaper

ABSTRACT: A feeding mechanism for pickup baler in which a rotary feed unit delivers crop material to a set of packer fingers which convey the material into the bale chamber between plunger strokes. The rotary feed unit is mounted for operation about a generally vertical axis and comprises two sets of feed fingers which successively sweep crop material across the feeder platform and into the path of the packer fingers. The angular position of the feed fingers is controlled by a circular cam track.

Patented March 16, 1971
3,570,395
4 Sheets-Sheet 1
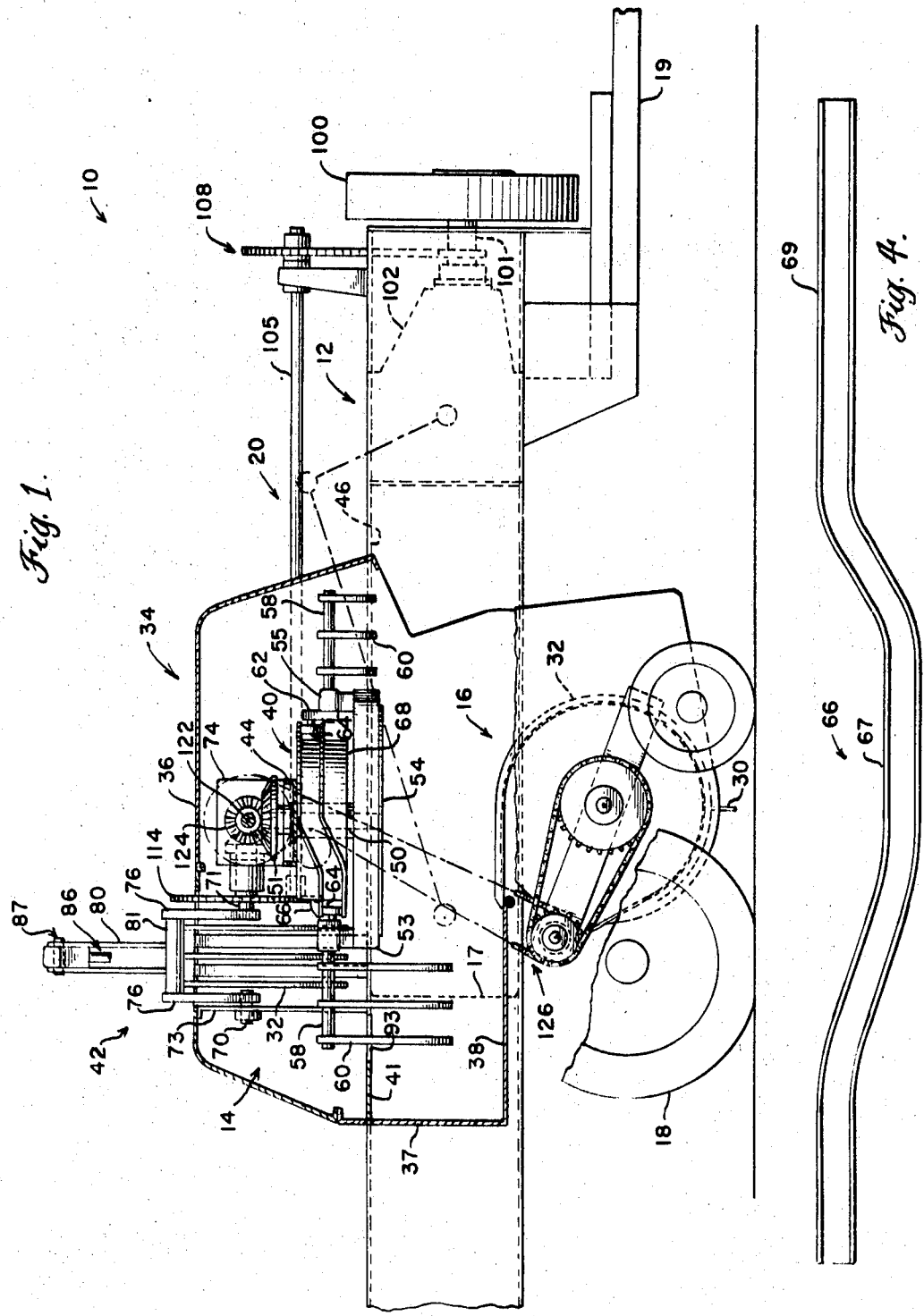
INVENTORS
HARRY C. EBERLY
& RAYMOND E. FISHER
BY Donald D. Schaper
ATTORNEY

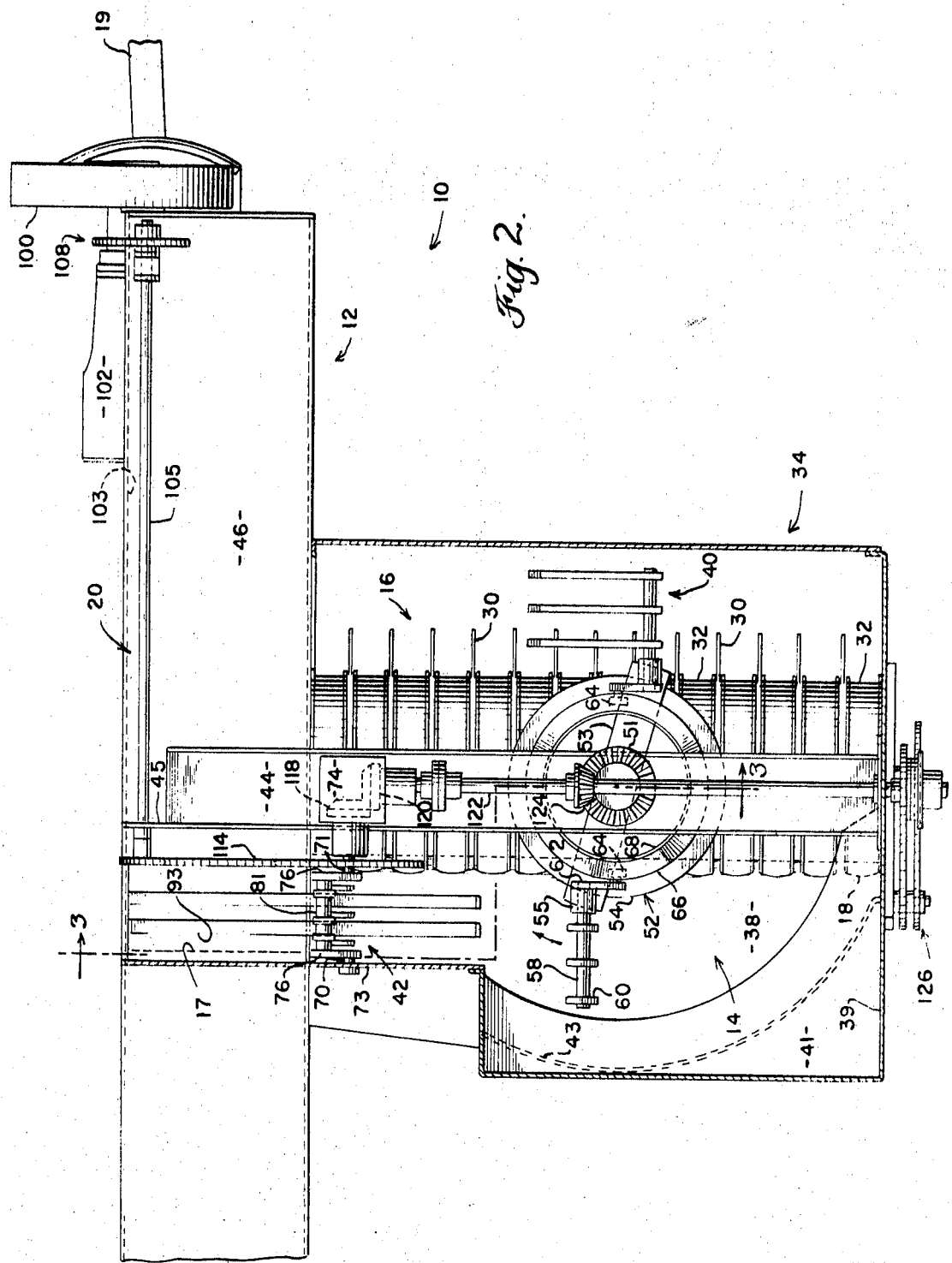

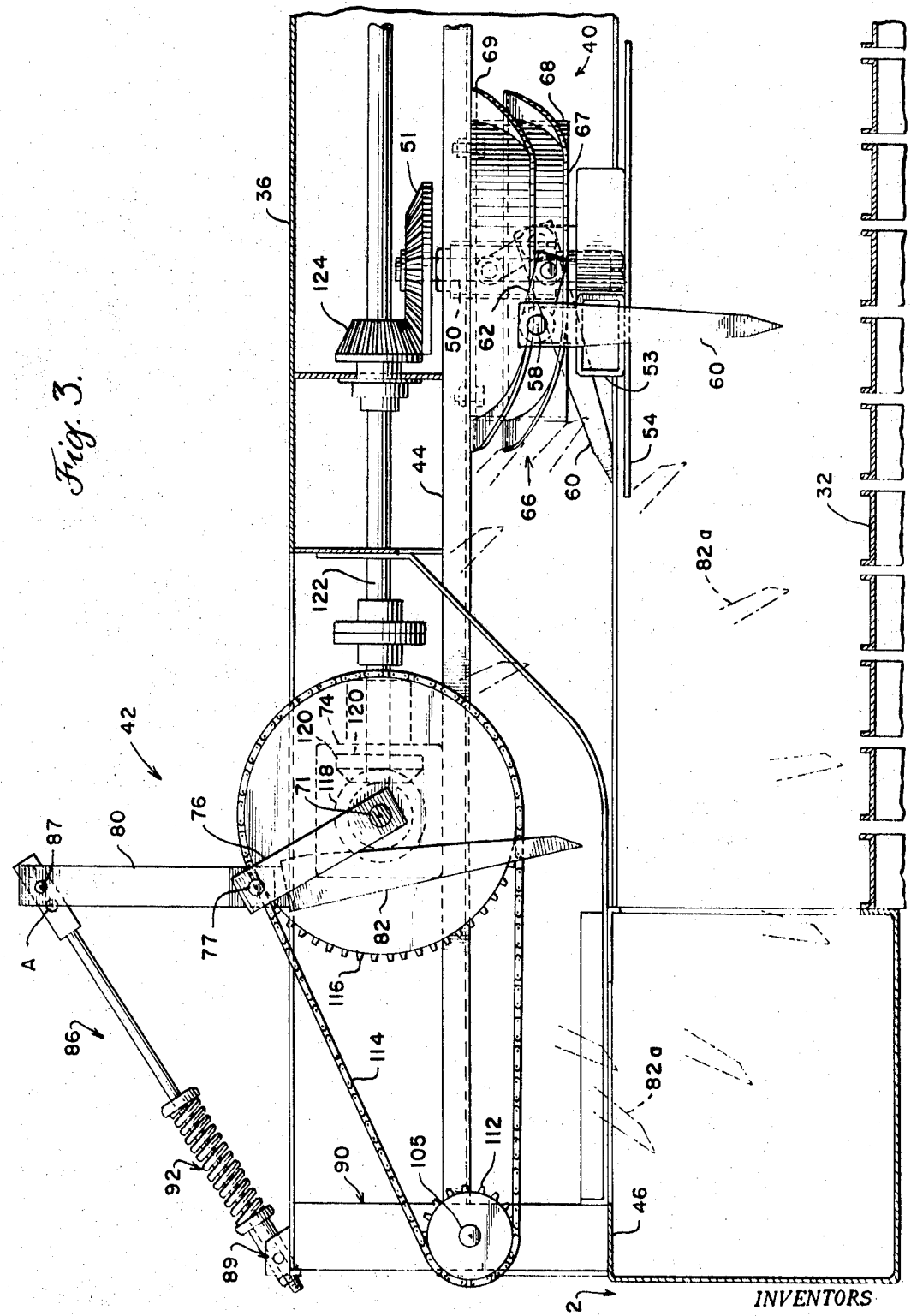

Patented March 16, 1971

INVENTORS
HARRY C. EBERLY
& RAYMOND E. FISHER

BY Donald D. Schaper
ATTORNEY

BALER FEEDING SYSTEM

BACKGROUND OF THE INVENTION

A typical pickup baler comprises a wheel-supported frame which carries a fore-and-aft extending bale chamber and a plunger reciprocably mounted therein for compressing crop material into bales. A feeder housing extends from one side of the bale chamber, and crop material is delivered to a floor, or platform, in the housing by a rotatable pickup located forwardly of the feeder housing. A feeding mechanism operable in the housing is adapted to move crop material across the platform and deliver it into the bale chamber.

In some types of balers, the feeding mechanism comprises an auger, or other continuous feed means, for conveying the material across the feeder platform and into the bale chamber. Since an auger, or conveyor of this type, is fixed against shifting longitudinally in the direction of feeding, the delivery end of the conveyor must necessarily terminate outside the bale chamber, with the result that material is not conveyed as far into the bale chamber as is desirable. When the material is not effectively distributed in the bale chamber, uneven and poorly shaped bales are produced by the baler.

Finger feeding mechanisms have been developed in which the fingers themselves penetrate into the bale chamber through slots in the top wall of the chamber. An improved distribution of the crop material in the bale chamber is obtained by the use of the feed fingers. However, since these fingers cross the path of the reciprocating plunger, the fingers and the plunger must be timed so that the plunger does not strike the fingers, Two types of finger mounting means are used extensively. In one type of mounting means, the fingers are carried on a reciprocating carriage; in a second type, the fingers are mounted on rotating cranks which cause the fingers to move through an orbital path. A disadvantage of the carriage mounted fingers is the wear problems which occur because of the reciprocating movement and the rapid acceleration and e deceleration of the carriage.

It is common to employ a set of orbiting feed fingers adjacent the bale chamber for delivering the material into the base case. A second conveying means, e.g., another set of orbiting feed fingers, or an auger, is mounted over the outboard side of the feeder platform for moving the material across the platform and into the path of the fingers operating adjacent the bale chamber. These types of feeding mechanisms normally work well in medium capacity balers having plunger speeds of 80 strokes per minute, or less. However, they have not been generally satisfactory in high capacity balers operating at plunger speeds approaching 100 strokes per minute. One main problem has been in moving the material across the feeder platform at sufficient speed and in delivering it to the fingers adjacent the bale chamber in a desired form. If the material delivered to the fingers is matted and highly compressed, it is difficult for the fingers to penetrate the material and move it into the bale chamber.

SUMMARY OF THE INVENTION

The feeding mechanism of this invention comprises a pair of feed units. A first feed unit operates adjacent the bale chamber and comprises an orbiting set of packer fingers. The packer fingers operate over a small area of the platform in the feeder housing, and run at the same speed as the baler plunger.

A second feed unit is mounted forwardly of, and outboard of, the packer fingers. The second unit is a rotary unit and includes two diametrically opposed sets of feed fingers. A caming mechanism regulates the angular position of each set of fingers so that when the fingers pass over the platform they are in a generally vertical position and as the fingers move away from the platform and over the rotatable pickup they are moved to a generally horizontal position. The speed of the rotary feed unit is one-half the speed of the plunger.

The fingers of the rotary feed unit enter the crop material at the outboard side of the platform when the material is still oriented in substantially the same manner as it was in the windrow. The fingers sweep the material across the platform in this form and deliver it to the packer fingers. As the feed fingers pass adjacent to the packer fingers, they are cammed upwardly to lift them out of the crop material, the packer fingers immediately enter the material in the area occupied by the feeder fingers, and thus, they do not have to penetrate a compressed mass of crop material. The relatively slow speed at which the rotary feed unit operates, due to the two sets of feed fingers, permits an even continuous flow of the crop material toward the bale chamber. The windrow of material, lifted to the feeder platform by the pickup, is conveyed across the platform by the feed fingers, without a substantial change in the orientation of the crop material.

The principal object of this invention is to provide a feeding mechanism for a baler of the type described which can be efficiently operated with high speed plungers.

Another object of this invention is to provide a finger feeding mechanism in which the material is conveyed across the platform in an even continuous movement.

Another object of this invention is to provide a feeding mechanism which can be operated on crop material as it comes from the windrow, and without the precompressing thereof by the pickup.

Other objects of this invention will be apparent hereinafter from the specification and from the recital in the appended claims.

FIG. 1 is a side elevational view of a pickup baler, a portion of the feeder housing being shown in section to expose the feeding mechanism of this invention.

FIG. 2 is a plan view of FIG. 1, with the feeder housing shown in section.

FIG. 3 is a somewhat enlarged section, taken approximately as indicated by the irregular line 3—3 in FIG. 2, and showing the path of travel of the packer fingers.

FIG. 4 is a developed view of the cam track employed in the rotary feed unit.

DESCRIPTION OF THE PREFERRED EMBODIMENT

Figure 6:
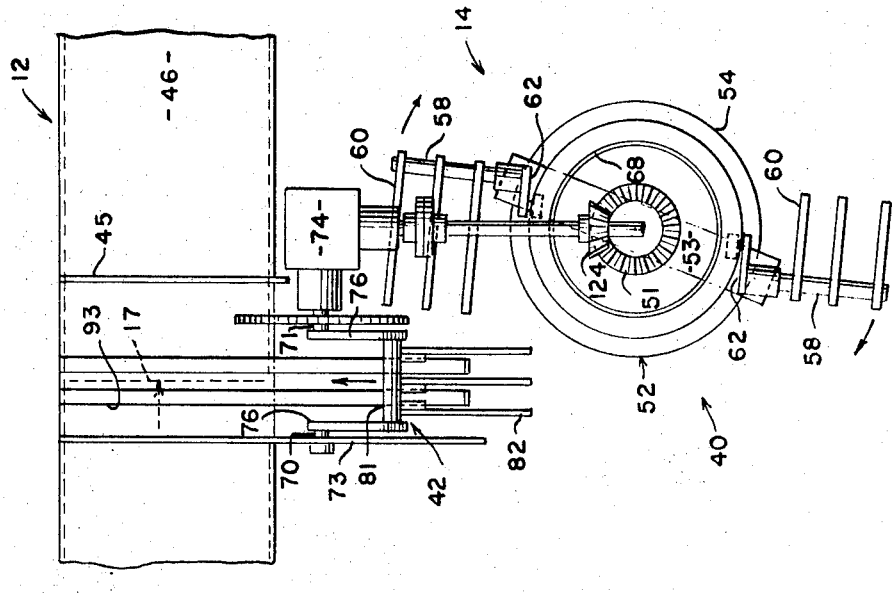
FIG. 6 is a view similar to FIG. 5, but showing the relative positions of the packer fingers and feed fingers in a different timing arrangement in which the feed fingers are timed to unload their charge of material while the packer fingers are relatively high above the platform.

Referring now to the drawings by numerals of reference and particularly to FIGS. 1 and 2, the baler selected to illustrate this invention is designated 10. Baler 10 comprises a bale chamber 12 which extends in a fore-and-aft direction, a feeding mechanism 14 which is adapted to convey crop material into the bale chamber, and a rotatable pickup 16 which lifts the crop material from the ground and delivers it to the feeding mechanism. A plunger 17 indicated diagrammatically in FIGS. 1—2 and 5—6, is mounted for reciprocable movement in bale chamber 12. Baler 10 is mounted on wheels 18 for movement through a field, and a tongue 19, shown fragmentarily in FIGS. 1 and 2, is adapted to be connected to a tractor, not shown. A drive system 20 furnishes power to the baler components and is in turn driven by the tractor power takeoff not shown.

Rotatable pickup 16, as shown in FIGS. 1 and 2, comprises a plurality of rows of circumferentially spaced pickup 30 which engage the crop material on the ground and move it upwardly and rearwardly to the feeding mechanism. Fingers 30 are separated by laterally spaced stripper members 32.

A feeder housing 34 extends over rotatable pickup 16 and the feeding mechanism 14, and comprises a roof section 36, a vertically extending rear wall 37, a platform, or floor portion, 38, and an outboard sidewall 39. A horizontal plate 41 and a circular wall portion 43 in the rear section of the feeder housing serve to confine the material it is being conveyed toward the bale case.

Feeding mechanism 14 comprises a rotary feed unit 40 which moves the crop material from the outboard side of the baler inwardly toward the bale chamber. Feed unit 40 delivers the material to an orbiting feed unit 42 which conveys the material into the bale chamber.

Rotary feed unit 40 is carried on a transversely extending support member 44 which is fixed at one end to a vertical wall 45 on top wall 46 of the bale chamber and at its opposite end to sidewall 39 of the feeder housing. A vertically extending shaft 50 is journaled in support member 44 and carries a bevel gear 51 at its upper end and a feed finger carrier 52 on its lower end. Carrier 52 consists of a heavy frame member 53 and a circular plate 54 fixed to member 53 and adapted to prevent crop material from getting into the feed unit drive mechanism. At each end of frame member 53, a support element 55 is mounted which carries a rockshaft 58. A plurality of feed fingers 60 are fixed to each rockshaft 58, and the angular position of fingers 60 is regulated through a crank arm 62 fixed at one end to rockshaft 58. A roller 64 is mounted to the opposite end of crank arm 62, and the roller is adapted to run in cam track 66 which is carried on a cylindrical member 68 fixed to support member 44.

Figure 5:
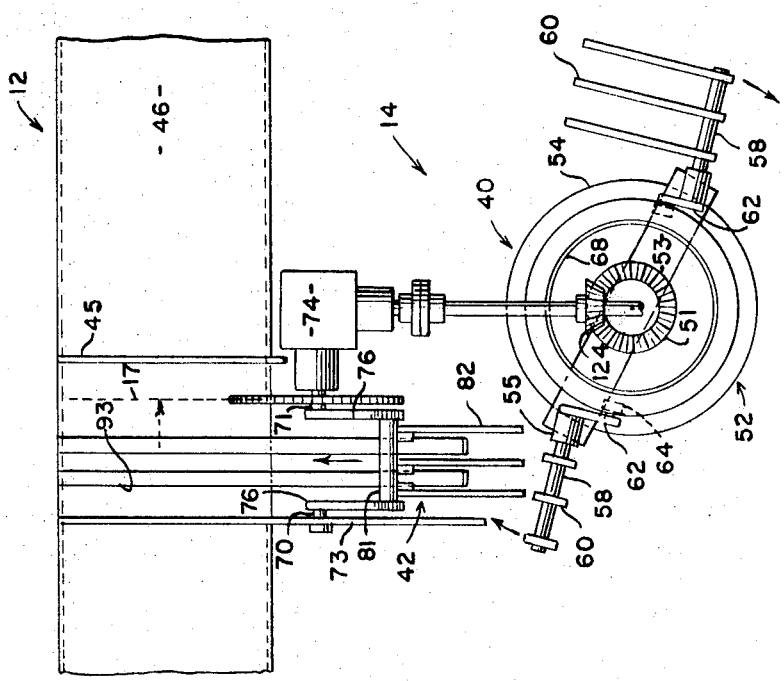
FIG. 5 is a diagrammatic plan view of the rotary feed unit, illustrating the relative positions of the packer fingers and the feed fingers when the feed fingers are timed to deliver the crop material just in front of the packer fingers.

The angular position of feed fingers 60 is positively controlled by cam track 66. A developed view of the cam track is shown in FIG. 4. Feed fingers 60 assume a substantially vertical position when the rollers are in the lower portion 67 of the cam track (see FIGS. 3 and 4). As the rollers move into the upper portion 69 of the cam track, the feed fingers are pivoted in a counterclockwise direction, as viewed in FIG. 3. With reference to FIGS. 2, 5—6, it will be noted that fingers 60 are mounted at an angle, in the radial direction, to member 53. With the feed fingers so mounted, the feed fingers extend generally in the same direction as the packer fingers when they release the material to the packer fingers (see FIG. 5). Further, this angular mounting permits the feed fingers to be housed in a smaller area than would be possible if they extended radially from member 53.

Feed unit 42, as best shown in FIGS. 2 and 3, comprises a pair of crank shafts 70 and 71 journaled respectively in a vertical wall 73 and gearbox 74. A crank 76 is mounted on each of the shafts 70 and 71 and a crank pin 77 joins the outer radial ends of the crank 76. Upwardly extending arms 80 are fixed to a hub 81 pivotally mounted on crank pin 77. Packer fingers 82 are fixed to hub 81 and extend generally opposite arms 80. A control link 86 is pinned at 87 to arms 80 and at 89 to a vertical support 90 on bale chamber 12. A spring element 92 permits limited extension of the control link 86. The path of travel of the packer fingers is indicated by a series of packer finger end portions 82a, shown in dot and dash lines in FIG. 3. The packer fingers 82, in feeding the material into the bale chamber, pass through slots 92 in top wall 46 of the bale chamber.

Feeding mechanism 14 is driven by a drive system 20 which comprises a baler flywheel 100 operatively connected to the tractor power takeoff, not shown. A connecting shaft 101 extends rearwardly of flywheel 100 to a gearbox 102 mounted in sidewall 103 of the bale case. A longitudinally extending main drive shaft 105 is carried on top wall 46 of the bale chamber and is connected to shaft 101 through a chain and sprocket drive 108.

Shaft 105 is journaled at its rear end in a vertical wall 45 and carries a sprocket 112 rearwardly of the wall 45. A chain 114 connects sprocket 112 to a sprocket 116 carried on shaft 71. Shaft 71 furnishes power to gearbox 74 through a bevel gear 118. Bevel gear 118 meshes with a second bevel gear 120 carried on a cross shaft 112. Cross shaft 122 drives rotary feed unit 40 through a bevel gear 124 which meshes with gear 51. At its outboard end, shaft 122 furnishes power to pickup 16 through a chain drive 126. The timing of the feed fingers relative to the packer fingers can be controlled by disconnecting gear 124 and rotating the feed fingers to the desired position. The preferred arrangement is shown in FIG. 5, and in this arrangement, the feed fingers 60 deliver material just in front of the packer fingers 82, and the packer fingers move into the crop material in substantially the same area occupied by the feed fingers. A second timing arrangement is shown in FIG. 6, and in this arrangement, the charge of crop material is released on the platform by the feed fingers while the packer fingers are in an elevated position. The packer fingers are then moved rapidly in behind the delivered charge before it expands out of the delivered position.

In the operation of the described machine, crop material is delivered onto platform 38 by the rotatable pickup 16. A set of fingers 60 engages the material at the outboard side of the baler and moves the material across the platform 38 toward the bale chamber and into the path of packer fingers 82. The packer fingers then deliver material into the bale chamber. In the preferred embodiment, shown in FIG. 5, the feed fingers deliver the crop material just in front of the descending packer fingers. Just as the packer fingers move down into contact with the charge of crop material, the feed fingers are pivoted away from the packer fingers; as the feed fingers rotate toward the pickup, they are pivoted upwardly to a generally horizontal position. The fingers remain in a generally horizontal position as they move across the pickup and are again pivoted downwardly just before reaching platform 38 to pick up a new charge of material. Because of the two sets of feed fingers, the feed fingers are rotated at one-half the speed of the packer fingers and the plunger.

When rotary feed unit 40 first contacts the material at the outboard side of the feeder platform, the feed unit is travelling in generally the same direction as the material. As the feed unit 40 continues on around, it serves to turn the material toward the bale case. The relatively slow moving feed unit 40 thus exerts an even, continuous action on the material. The material is swept toward the bale case, without churning the material, and without changing the orientation of the material as it occurred in the windrow. There is no necessity for the pickup to serves as a precompressing means in this type of feeding mechanism.

It has been found that material, as it moves across the platform, tends to fold around the feed fingers 60 to form a slightly U-shaped charge. The packer fingers deliver the charge into the bale case in this form. Each of the U-shaped charges becomes a slice in the finished bale. The bales thus formed are easy to use when reopened and are very desirable due to their uniformity.

While this invention has been described in connection with a particular embodiment thereof, it will be understood that it is capable of further modification and this application is intended to cover any variations, uses or adaptations of the invention, following, in general, the principles of the invention, and including such departures from the present disclosure as come within known or customary practice in the art to which the invention pertains, and as fall within the scope of the invention as the limits of the appended claims.

I claim:

1. In a crop handling machine having a platform along which crop material is moved to a crop receiving means, the improvement comprising: a feed unit adapted to move crop material along said platform and toward said crop receiving means, said feed unit comprising support means spaced upwardly from the level of said platform, carrier means rotatably mounted on said support means for continuous orbital movement about a generally vertical axis, finger means on said carrier means, said finger means being adapted to assume a generally vertical position as it moves toward said crop receiving means to move crop material along said platform and a generally horizontal position as it moves away from said crop receiving mean, and, means for controlling the angular position of said finger means.

2. In a crop handling machine, as recited in claim 1, wherein a second feed unit is provided located adjacent said crop receiving means and between said first feed unit and said crop receiving means, said first feed unit delivers crop material to said second feed unit and said second feed unit delivers crop material into said crop receiving means with the path of movement of said first feed unit crossing to the rear of said second feed unit.

3. In a crop handling machine, as recited in claim 1, wherein said finger means comprises a pair of feed finger assemblies pivotally mounted on said carrier means, said finger assemblies are located substantially 180° apart, and said means for controlling the angular position of said finger means comprises a cam track fixed to said support means.

4. A baler comprising in combination a fore-and-aft extending bale chamber with a feed opening in a vertical sidewall thereof, a generally horizontal material receiving platform extending laterally from adjacent the lower end of said opening, a first feed unit operable over said platform for conveying material through said opening and into said bale case, a second feed unit operable to supply material into the path of said first feed unit, said second feed unit comprising finger means adapted to extend generally vertically relative to said platform, said finger means being mounted for orbital rotation about a generally vertical axis, and cam means for controlling the attitude of said finger means.

5. A baler, as recited in claim 4, wherein said first feed unit comprises a packer finger assembly adapted to orbit about an axis extending generally parallel to said bale chamber.

6. A baler, as recited in claim 5, wherein said finger means comprises a pair of feed finger assemblies oppositely disposed on a rotatable carrier.

7. A hay baler, as recited in claim 4, wherein drive means is provided to rotate said first and second feed units and said drive means operates said second unit at one-half the speed of said first unit.

8. A baler comprising a fore-and-aft extending bale chamber having a top wall and a vertical sidewall with a feed opening therein, a generally horizontal crop material receiving platform extending laterally from adjacent the lower end of said opening, and a feed unit adapted to move crop material along said platform and toward said feed opening, said feed unit including carrier means supported above said platform for continuous rotational movement in one direction about a generally vertically extending axis, and finger means counted on said carrier means for swinging movement about a generally horizontally extending axis.

9. A baler, as recited in claim 8, wherein said finger means include a pair of feed finger assemblies pivotally mounted on said carrier means, said assemblies being generally diametrically opposed to each other, said baler further including cam means for controlling the angular position of said finger assemblies.

10. An automatic hay baler, as recited in claim 9, wherein each of said feed finger assemblies includes a shaft journaled adjacent the outer periphery of said carrier means, a plurality of fingers and fixed to said shaft, and follower means fixed to one end of said shaft, said cam means comprises a circular cam track, the parts being so arranged and constructed so that said follower means rides in said track to pivot said shaft and the fingers carried thereon.

11. In a baler having:
 a bale case having sidewall and a bale chamber with a plunger reciprocably mounted therein for compressing crop material into bales and having an opening in one of said sidewalls for delivery of crop material to said bale chamber;
 a feed housing extending transversely from said sidewall with said opening and having a platform and feed chamber forming a transversely extending side thereabove for receiving crop material through said opening in said sidewall, and
 packer fork means mounted adjacent said sidewall to sweep downwardly and towards said bale case and through said opening for conveying crop material into said bale chamber;
 a feeder means on the opposite side of said packer fork means from said bale case and rotatably mounted above said feed chamber to orbit in one direction about a vertical axis and having feeder fingers extending vertically downward into said chamber to sweep crop material towards said bale case and passing through the downward path of said packer fork means to deposit crop material in the path of said packer fork means for sweeping the deposited crop material through said opening into said bale chamber for compression into a bale.

12. A baler as set forth in claim 11, wherein said feeder means has means for pivoting said feeder fingers generally horizontally in a direction counter to the orbital rotation, said feeder fingers pivoting horizontally at the downward path of said packer fork means to deposit the crop material for engagement by said packer fork means.

13. In a baler having:
 bale case having a vertical sidewall with an opening for passing a charge of crop material in said bale case and a feed housing extending transversely from said sidewall and having a feed chamber the combination therewith of; and
 crop material feeding means comprising a carrier rotatably mounted on said housing (and with) to continuously orbit in one direction about a vertical axis, said carrier having pivotally mounted feeder fingers (movable between) and control means activating said feeder fingers to a recessed counter rotational position for (clearing) passing over crop material and an extended position for sweeping a charge of crop material into and along said feed chamber towards said bale case and a dynamic packer support with packer fingers moved by said support in a generally vertical path downwardly into said feed chamber immediately in front of said extended feeder fingers (as), said control means having means to time the movement of said feeder fingers (move) counter to carrier rotation from the charge sweeping extended position to a noncontacting crop material recessed position (whereby) as said packer fingers (enter) contact the charge of crop material (area) previously (occupied) contacted by said feeder fingers and continue the sweep of the charge of crop material into said bale case as said feeder fingers move toward the recessed position clear of said packer fingers.